United States Patent
Hui et al.

(10) Patent No.: US 6,760,438 B1
(45) Date of Patent: Jul. 6, 2004

(54) SYSTEM AND METHOD FOR VITERBI DECODING ON ENCRYPTED DATA

(75) Inventors: Yan Hui, Nepean (CA); Karl D. Mann, Nepean (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/345,419

(22) Filed: Jul. 1, 1999

(51) Int. Cl.[7] ............................................. H04L 9/00
(52) U.S. Cl. .................. 380/28; 713/200; 370/347; 370/468; 370/524; 455/423; 380/29; 380/37; 380/46; 380/252
(58) Field of Search ............................ 380/28, 29, 37, 380/45, 46, 252, 262, 266, 269, 270; 713/200, 159; 375/133, 148, 152, 366; 370/347, 468, 524; 455/423, 425

(56) References Cited

U.S. PATENT DOCUMENTS

| | | | | | |
|---|---|---|---|---|---|
| 4,208,739 | A | * | 6/1980 | Lu et al. | 380/28 |
| 4,908,861 | A | * | 3/1990 | Brachtl et al. | 713/187 |
| 4,914,699 | A | * | 4/1990 | Dunn et al. | 380/34 |
| 5,056,117 | A | * | 10/1991 | Gitlin et al. | 375/234 |
| 5,237,506 | A | * | 8/1993 | Horbal et al. | 705/403 |
| 5,363,413 | A | * | 11/1994 | Vos | 375/340 |
| 5,406,585 | A | * | 4/1995 | Rohani et al. | 375/341 |
| 5,416,787 | A | * | 5/1995 | Kodama et al. | 714/790 |
| 5,425,103 | A | * | 6/1995 | Shaw | 380/44 |
| 5,471,500 | A | * | 11/1995 | Blaker et al. | 375/340 |
| 5,502,735 | A | * | 3/1996 | Cooper | 714/794 |
| 5,517,614 | A | * | 5/1996 | Tajima et al. | 714/1 |
| 5,586,128 | A | * | 12/1996 | Chen | 714/792 |
| 5,619,576 | A | * | 4/1997 | Shaw | 380/44 |
| 5,692,006 | A | * | 11/1997 | Ross | 375/147 |
| 5,740,251 | A | * | 4/1998 | Tajima et al. | 380/269 |
| 5,778,192 | A | * | 7/1998 | Schuster et al. | 709/247 |
| 5,787,133 | A | * | 7/1998 | Marchetto et al. | 375/366 |
| 5,793,940 | A | * | 8/1998 | Tajima et al. | 714/1 |
| 5,802,116 | A | * | 9/1998 | Baker et al. | 375/341 |
| 5,844,946 | A | | 12/1998 | Nagayasu | 375/341 |
| 5,905,801 | A | * | 5/1999 | Serinken | 380/51 |
| 5,966,450 | A | * | 10/1999 | Hosford et al. | 380/261 |
| 6,009,128 | A | * | 12/1999 | Mobin et al. | 375/341 |
| 6,035,040 | A | * | 3/2000 | Mann et al. | 380/28 |
| 6,052,780 | A | * | 4/2000 | Glover | 713/193 |
| 6,065,117 | A | * | 5/2000 | White | 713/159 |
| 6,151,370 | A | * | 11/2000 | Wei | 375/341 |
| 6,157,723 | A | * | 12/2000 | Schultz | 380/273 |
| 6,167,426 | A | * | 12/2000 | Payne et al. | 709/200 |
| 6,252,961 | B1 | * | 6/2001 | Hogan | 380/37 |
| 6,324,288 | B1 | * | 11/2001 | Hoffman | 380/249 |
| 6,327,508 | B1 | * | 12/2001 | Mergard | 700/5 |
| 6,466,767 | B1 | * | 10/2002 | Lidbrink et al. | 455/67.1 |

FOREIGN PATENT DOCUMENTS

| | | | | |
|---|---|---|---|---|
| EP | 363640 A2 | * | 4/1990 | |
| EP | 910190 A2 | * | 4/1999 | |
| JP | 2001266501 A | * | 9/2001 | ........... G11B/20/14 |

* cited by examiner

Primary Examiner—Ly V. Hua

(57) ABSTRACT

A system and method for Viterbi decoding on encrypted data is disclosed. At the receiver, maximum likelihood decoding is performed based on received input in the encryption domain. When selecting a path from one stage of a Viterbi decoding trellis to the next, a local metric may be associated with each of the possible paths based on Euclidean distance between a received symbol and a path state. The path state is determined by encrypting the binary path state. An overall metric is associated with each state equivalent to a sum of local path metrics along a survivor path of selected paths. At the end of the Viterbi decoding trellis, a decoded and decrypted bit sequence is obtained by tracing back in a conventional manner.

25 Claims, 11 Drawing Sheets

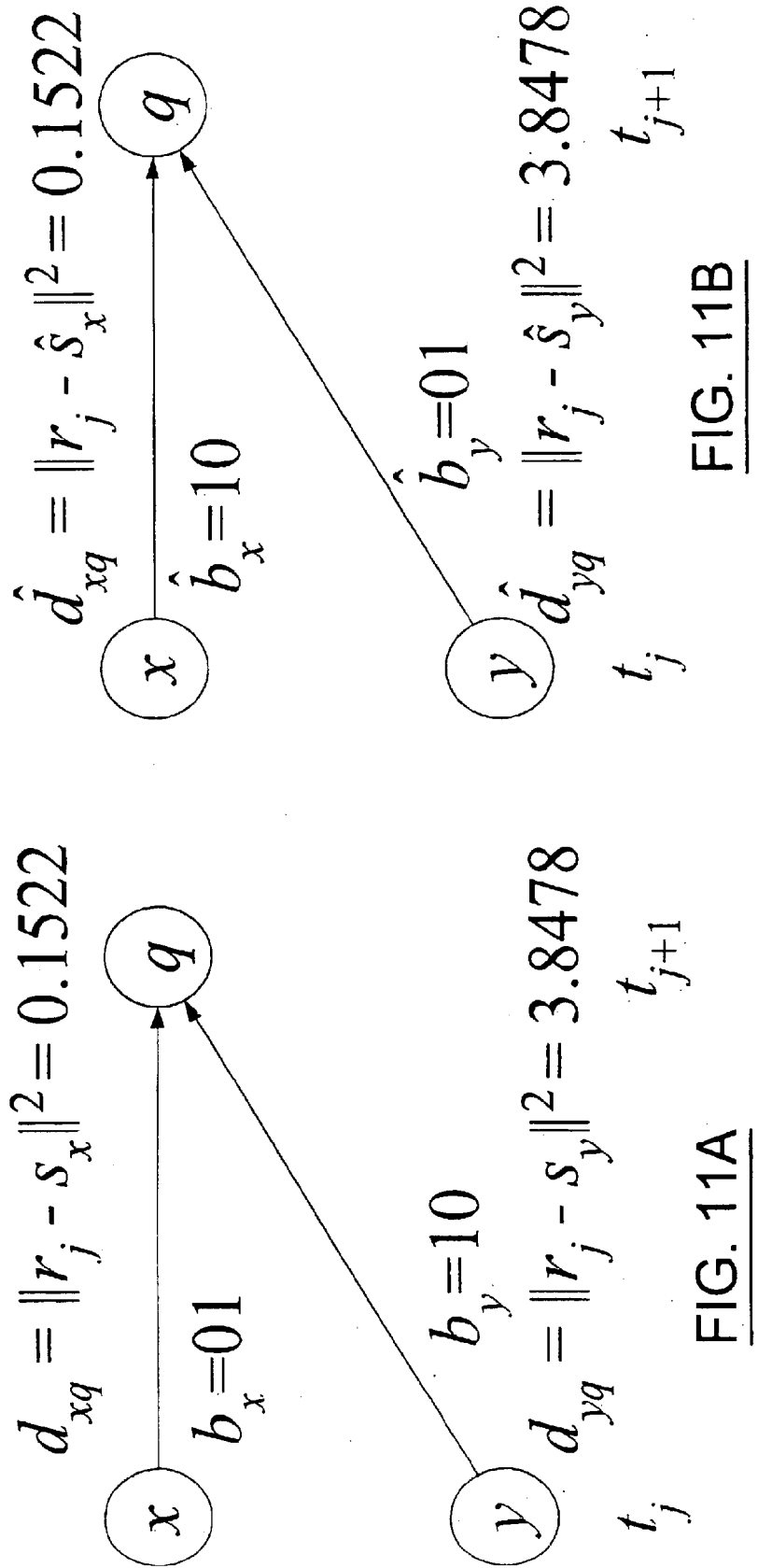

SYSTEM AND METHOD FOR VITERBI DECODING ON ENCRYPTED DATA

FIELD OF THE INVENTION

The present invention relates to decoding of digital information sequences and in particular to Viterbi decoding of encrypted digital information sequences.

BACKGROUND OF THE INVENTION

A typical communication scheme includes a transmitter, with a modulator for converting a digital information sequence into a signal, and a receiver, with a demodulator which can recover a digital information sequence from the received signal. A channel, which is between a transmitter and a receiver and may be wireless or wireline, may degrade the signal, through attenuation or the introduction of noise, such that a received sequence differs from the transmitted sequence. The differences between the transmitted and received sequences may be called "errors". To minimize errors in received sequences, forward error correction coding may be employed through the use of a channel encoder in the transmitter and a channel decoder in the receiver.

Error correction coding is the practice of transmitting additional redundant bits besides the digital information sequence such that a receiver may determine if the received sequence is the same as the sent sequence and, if not, correct the received sequence. The coding may be applied intermittently to "blocks" of bits, continuously to bits in a bit stream or employ a combination of the two methods. One form of continuous coding is "convolutional coding" in which a series of bits at the output of a channel encoder represent a result of operations performed on a set number of input bits. In a rate ½ convolutional encoder, a series of two new output bits are generated for each input bit. Along with the rate of a convolutional encoder, another characteristic is a constraint length. The constraint length indicates the number of inputs that are operated upon to generate each output. A rate ½ convolutional encoder which outputs two bits $v_1$ and $v_2$ for each input $u_t$ has a "constraint length" of 3 if bits $v_1$ and $v_2$ are based on operations performed on $u_t$ and the two bits previous to $u_t$, $u_{t-1}$ and $u_{t-2}$. For example, we could have $v_1=u_t+u_{t-1}+u_{t-2}$ and $v_2=u_t+u_{t-2}$, where "+" represents modulo-2 addition.

A digital information sequence which has been subject to error correction coding must be decoded at the receiver. An optimum maximum likelihood decoder, for this type of coding, determines a sequence of bits which has a maximum likelihood of being the sequence that was sent. The Viterbi algorithm is a maximum likelihood decoding scheme for use at a receiver where an information sequence has employed an encoder using convolutional codes and the channel is an additive white Gaussian noise channel.

In general, channel decoding can be performed in two ways, namely, hard-decision decoding in a hard bit domain and soft-decision decoding in a soft bit (symbol) domain. Usually, samples of the demodulated signal are quantized resulting in bits so that, at the output of a demodulator, decoding can be performed in a bit-wise manner. In the hard bit domain, the demodulator quantizes each sample to one of two levels, i.e. 0 or 1, and is said to have made a hard-decision. The decoder that works with this kind of input is said to perform hard-decision decoding. On the other hand, if quantization is performed using more than two levels per bit, the resulting quantized samples are called soft symbols, or simply, symbols. The decoder making use of the information in soft-symbols is performing soft-decision decoding.

Hard-decision decoding has the advantage of less computational complexity than soft-decision decoding due to binary bit-wise operation. However, some useful information is lost during quantization. Therefore, hard-decision decoding does not perform very well under certain circumstances including, for example, a distorted channel, which is the case for real wireless communication systems.

A soft-decision decoder receives soft-decision inputs, which makes it more complex to implement. However, soft-decision decoding offers significantly better performance than hard-decision decoding. It has been reported that, to achieve the same error probability, at least 2 dB more signal power must be generated at the transmitter when the demodulator provides a hard-decision output, assuming an Additive White Gaussian Noise (AWGN) channel (see, for example, S. Lin and D. J. Costello Jr., "Error Control Coding: Fundamentals and Applications", Prentice-Hall, 1983, which is incorporated herein by reference). In other words, there is a 2 dB or more improvement for soft-decision decoding in an AWGN channel. In addition, this improvement implies an increment of the capacity in a cellular system, an important issue in the wireless industry.

U.S. Pat. No. 5,802,116 issued Sep. 1, 1998 to Baker et al. presents a method and apparatus for obtaining a soft symbol decoded output of a received signal by a two pass Viterbi operation. In a first pass the received signal is hard decision decoded. In a second pass the received signal is soft decision decoded with previously decoded hard bit information used as a most likely next state at a given time instant. This method sacrifices time in order to conserve memory required to store all possible next states at a given time instant.

A soft decision decoding receiver is disclosed in U.S. Pat. No. 5,844,946 issued Dec. 1, 1998 to Nagayasu. Used to reduce errors in channels which causes intersymbol interference (ISI), the receiver uses a training sequence to estimate the ISI present and uses the estimation to derive a replica of a received signal. The actual received signal and the replica are compared to generate a local metric for a particular path from a state at one time instant to a next state. The local metric is then used in a maximum likelihood decoding algorithm such as the Viterbi algorithm to obtain a decoded bit sequence.

The above patents are but two of a large volume of patents related to channel decoding. It should be noted that neither contemplate using soft decision decoding in conjunction with encryption.

In cellular telephony, the channel is a wireless connection from a mobile telephone to a relatively nearby base station. Despite channel coding, a properly equipped individual may "listen in" to conversations taking place over the channel. For this reason, a digital representation of a voice message may be encrypted.

Encryption in cellular telephony has drawn attention recently due to an increased requirement for personal privacy, electronic commerce and prevention of cellular phone fraud. Standards for digital mobile telephony were developed to include voice ciphering and signalling message and data encryption (see, for example, Electronics Industries Association/Telecommunication Industries Association (EIA/TIA) Interim Standard 95 (IS-95) for Code Division Multiple Access (CDMA) and Interim Standard (IS-136) for Time Division Multiple Access (TDMA)). In IS-136, encryption is applied after error correction coding of the speech signal and before modulation.

In a typical communication scheme, an encryption operation is performed before modulation in the transmitter and a decryption operation is performed after demodulation in the receiver. Current encryption schemes depend on this placement as encryption and decryption are performed in a binary bit-wise manner. For example, an encryption operation could comprise performing an exclusive-OR (XOR) operation with an encryption mask and the encoded information sequence as operands. The following is a truth table for the XOR ($\oplus$) operation.

| A | B | A $\oplus$ B |
|---|---|---|
| 0 | 0 | 0 |
| 0 | 1 | 1 |
| 1 | 0 | 1 |
| 1 | 1 | 0 |

If soft-decision decoding is used in the receiver, the input to the soft-decision decoder must be soft-decision samples instead of binary bits. This requires the demodulator make a soft-decision to obtain output symbols, for example, a multi-level quantized real number, 0.75, or a complex number, $\exp(j3\pi/8)$. As a result, the input and output of the decryption process may be in soft symbol format. As discussed, current encryption schemes are based on an operation on binary bits.

One possible way of combining soft-decision decoding and XOR-based decryption is to map the bit-wise encryption mask and XOR operation into the symbol domain. This mapping not only makes soft-decision decoding possible under current practice in IS-136 but also provides a technique that can map the XOR-based bit operation into the symbol domain in a communication system using phase-shift keying (PSK). However, the above method can only achieve optimum results when the modulation level is low, namely 2 or 4 PSK (see, for instance, application Ser. No. 08/953,763, "System and Method for Decryption in the Symbol Domain", Karl Mann and Yan Hui, hereby incorporated by reference). While this is sufficient for such communication systems as IS-136 TDMA systems, it cannot provide an optimum solution for higher level modulation, 8 PSK, for example, which has been standardized in IS-136 Rev. B, GPRS-136 and EDGE.

SUMMARY OF THE INVENTION

A method is provided for embedding decryption into Viterbi decoding. Metrics associated with paths of a Viterbi decoding trellis are calculated from a received signal and an encrypted path state. When the method is used in conjunction with a communication channel, such as the AWGN channel, where the received signal and encrypted path state are in the symbol domain, significantly less transmitter power is required than is required when encryption and decoding are performed separately in a hard bit domain.

In accordance with an aspect of the present invention there is provided a method for use in channel decoding including obtaining a channel decoding trellis having states, stages, and paths between states of adjacent stages, each of the paths having an associated path state. The method further including encrypting each path state with an encryption mask to result in an encrypted path state.

In accordance with another aspect of the present invention there is provided, in a channel decoding trellis comprising states and paths between the states, a method for selecting one path from a plurality of paths leading to a destination state. The method includes, for each path of the plurality of paths leading to the destination state, encrypting a path state, associated with each path, with an encryption mask to result in an encrypted path state, calculating a local metric from an input and the encrypted path state and associating the local metric with each path. Also for each path, the method includes associating an overall path metric with each path, where the overall path metric is equivalent to a sum of the local metric and an overall state metric associated with a state at the origin of the path. The method concludes by selecting one path of the plurality of paths leading to the destination state based at least in part on each overall path metric. In accordance with further aspects of the present invention there is provided a decoder having a processor for carrying out this method of the present invention, a communication system including a decoder having a processor for carrying out this method of the present invention and a computer software medium for providing program control for a processor for carrying out this method of the present invention.

In accordance with another aspect of the present invention there is provided a method for use in decrypting and decoding encrypted coded soft symbols, including associating a given encrypted encoded soft symbol with at least one stage and state of a decoding trellis, each path of the decoding trellis having an associated soft symbol path state and an equivalent hard symbol path state. The method further includes obtaining an encryption mask for use in decrypting the given encrypted encoded soft symbol, encrypting the equivalent hard symbol path state in the decoding trellis associated with each path leading to the at least one stage and state, utilising said encryption mask and determining an encrypted soft symbol path state corresponding to each encrypted equivalent hard symbol path state. The method concludes by determining metrics, each based on the given encrypted encoded soft symbol and one encrypted soft symbol path state. In accordance with a further aspect of the present invention there is provided a decoder for carrying out this method of the present invention.

In accordance with another aspect of the present invention there is provided a method for use in decrypting and decoding encrypted coded symbols, including associating a given encrypted encoded symbol with at least one stage and state of a decoding trellis, each path of the decoding trellis having an associated symbol path state which, where the trellis is in a hard symbol domain, is a hard symbol path state and which, where the trellis is in a soft symbol domain, is a soft symbol path state with an equivalent hard symbol path state. The method further includes obtaining an encryption mask for use in decrypting the given encrypted encoded symbol, encrypting said hard symbol path state in said decoding trellis associated with each path leading to said at least one stage and state, utilising said encryption mask. The method concludes by determining metrics utilising the given encrypted encoded symbol and each encrypted hard symbol path state. In accordance with a further aspect of the present invention there is provided a decoder for carrying out this method of the present invention.

In accordance with another aspect of the present invention there is provided a method for use in a decoder, including, obtaining an encryption mask. The method further includes, in a decoding trellis having an associated soft symbol path state and an equivalent hard symbol path state, determining a destination state corresponding with said encryption mask and encrypting the equivalent hard symbol path state associated with each path leading to the destination state utilising the encryption mask. The method concludes by determining an encrypted soft symbol path state corresponding to each encrypted equivalent hard symbol path state. In accordance with a further aspect of the present invention there is provided a decoder for carrying out this method of the present invention.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

In the figures which illustrate example embodiments of this invention:

FIGS. 11A and 11B illustrate example phases in a Viterbi decoding procedure using varied methods.

DETAILED DESCRIPTION OF THE PREFERRED EMBODIMENTS

Figure 1:
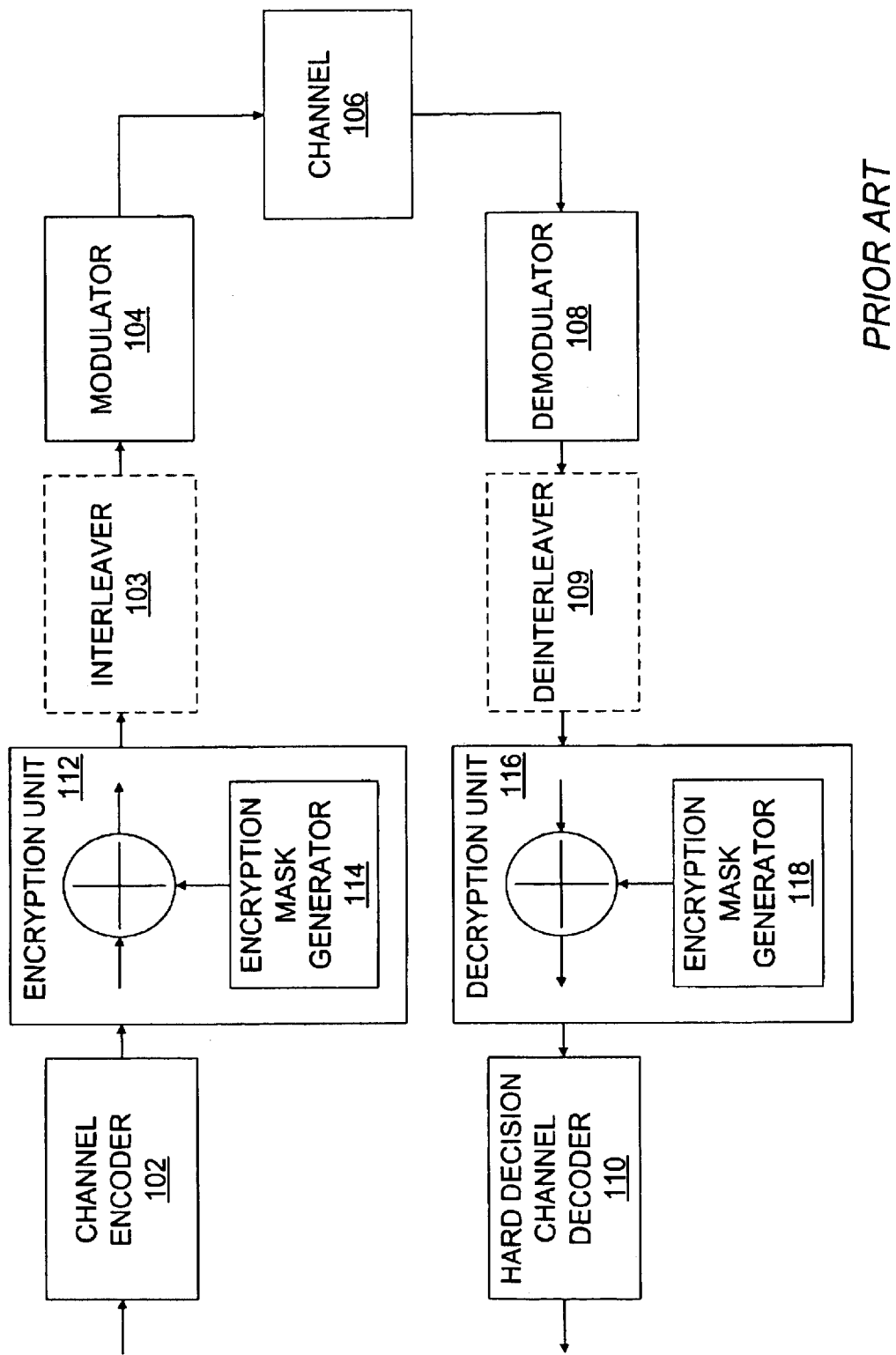
FIG. 1 illustrates, in a block diagram, a communication system employing hard-decision coding and XOR-based encryption.

In the known communication system of FIG. 1, the output of an encryption unit 112 may be the result of an XOR operation performed with output from a channel encoder 102 and output from an encryption mask generator 114 as operands. In one embodiment, encryption unit 112 provides output directly to a modulator 104, whereas, in a second embodiment encryption unit 112 provides output to an interleaver 103 whose output is input to modulator 104. After passing over a channel 106, in the non-interleaving case, a demodulator 108 provides a sequence of bits to a decryption unit 116 which then may perform an XOR operation with the sequence of bits and output from a decryption mask generator 118 as operands. In the interleaving case, a deinterleaver 109 acts on the output of demodulator 108 before decryption unit 116 is employed. Finally, the output of decryption unit 116 is passed to a hard decision channel decoder 110.

Figure 2:
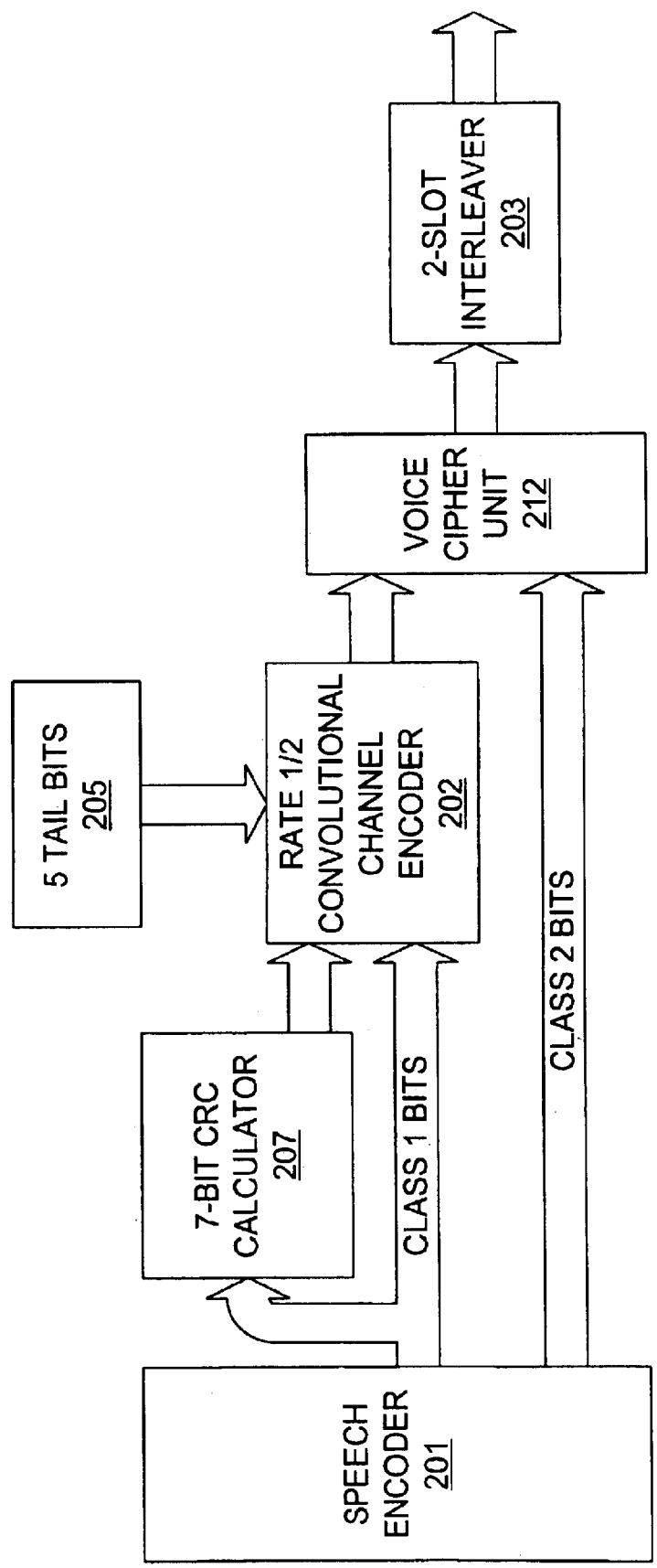
FIG. 2 illustrates, in a block diagram, an arrangement of convolutional coding and voice ciphering in IS-136.

FIG. 2 illustrates a particular embodiment of the transmission side of FIG. 1. Channel encoder 102, encryption unit 112 and interleaver 103 of FIG. 1 correspond in a general sense to a rate ½ convolutional channel encoder 202, a voice cipher unit 212 and a 2-slot interleaver 203, respectively.

FIG. 2 is representative of the IS-136 specification, depicting an arrangement of channel encoding, ciphering and interleaving of VSELP speech data. 77 Class 1 bits and 82 Class 2 bits are output from a speech encoder 201. Twelve of the Class 1 bits are input to 7-bit cyclical redundancy check (CRC) calculator 207. The output of the CRC calculator 207 is input to rate ½ convolutional channel encoder 202 along with the Class 1 bits and 5 tail bits 205. Channel encoder 202 output, in conjunction with Class 2 bits, is input to voice cipher unit 212. 2-slot interleaver 203 receives output from voice cipher unit 212 and outputs to a modulator. Interleaver 203 scrambles an input bit sequence in a deterministic manner such that successive bits are separated in time when transmitted on the channel. Once a deinterleaver has descrambled the bit sequence at the receiver, any errors that occurred on the channel as a burst are spread out and may be more easily corrected by error correction coding.

Figure 4:
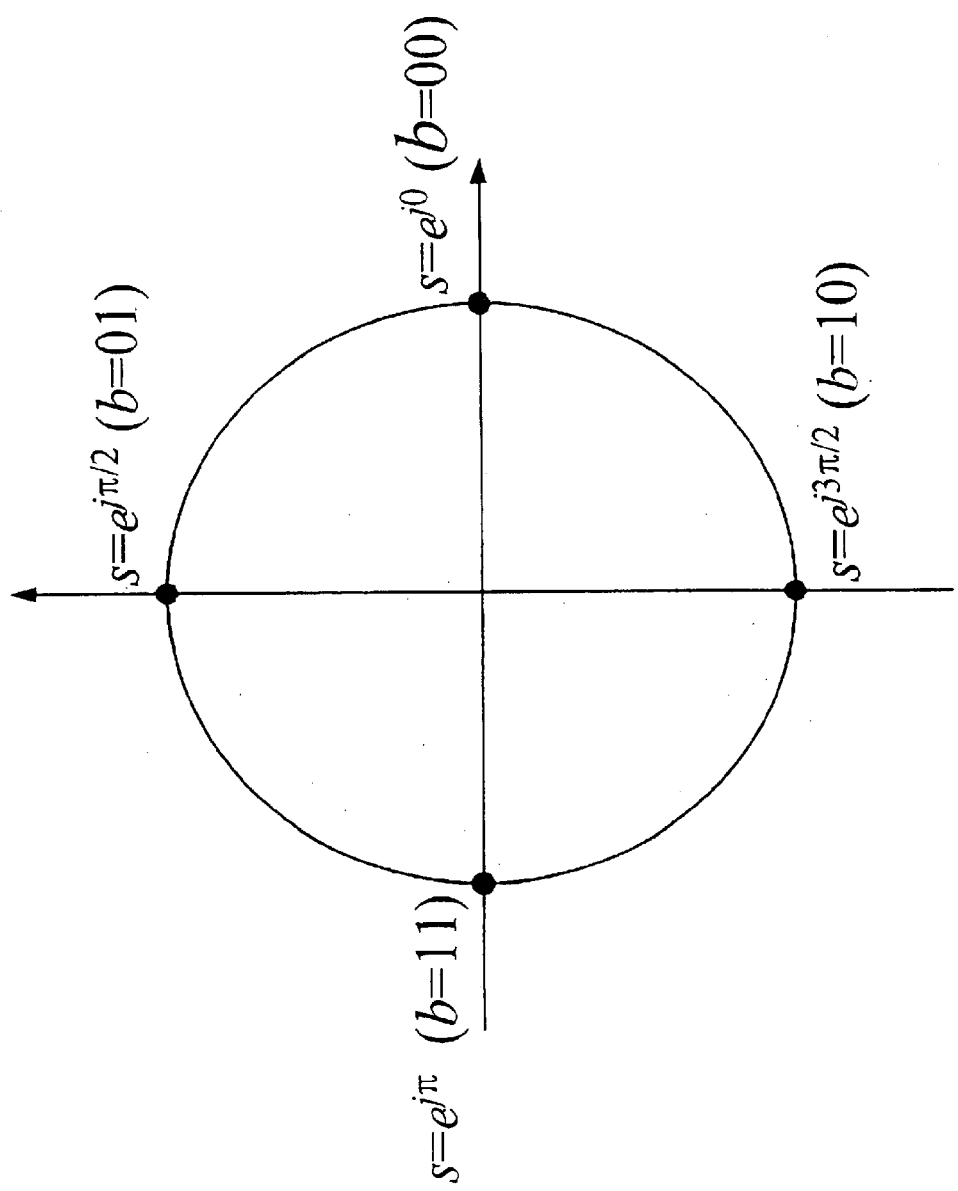
FIG. 4 illustrates a signal space diagram for Quadrature Phase Shift Keying (QPSK).

A coherence Quadrature PSK scheme, such as illustrated in FIG. 4, may be used for modulation. In such a case, a carrier wave is output from modulator 104 with a particular frequency and phases 0, $\pi/2$, $\pi$ and $3\pi/2$ corresponding to input to modulator 104 of 00, 01, 11 and 10, respectively. After channel 106, the output of demodulator 108 reflects the bits that were present at the input of modulator 104.

Figure 3:
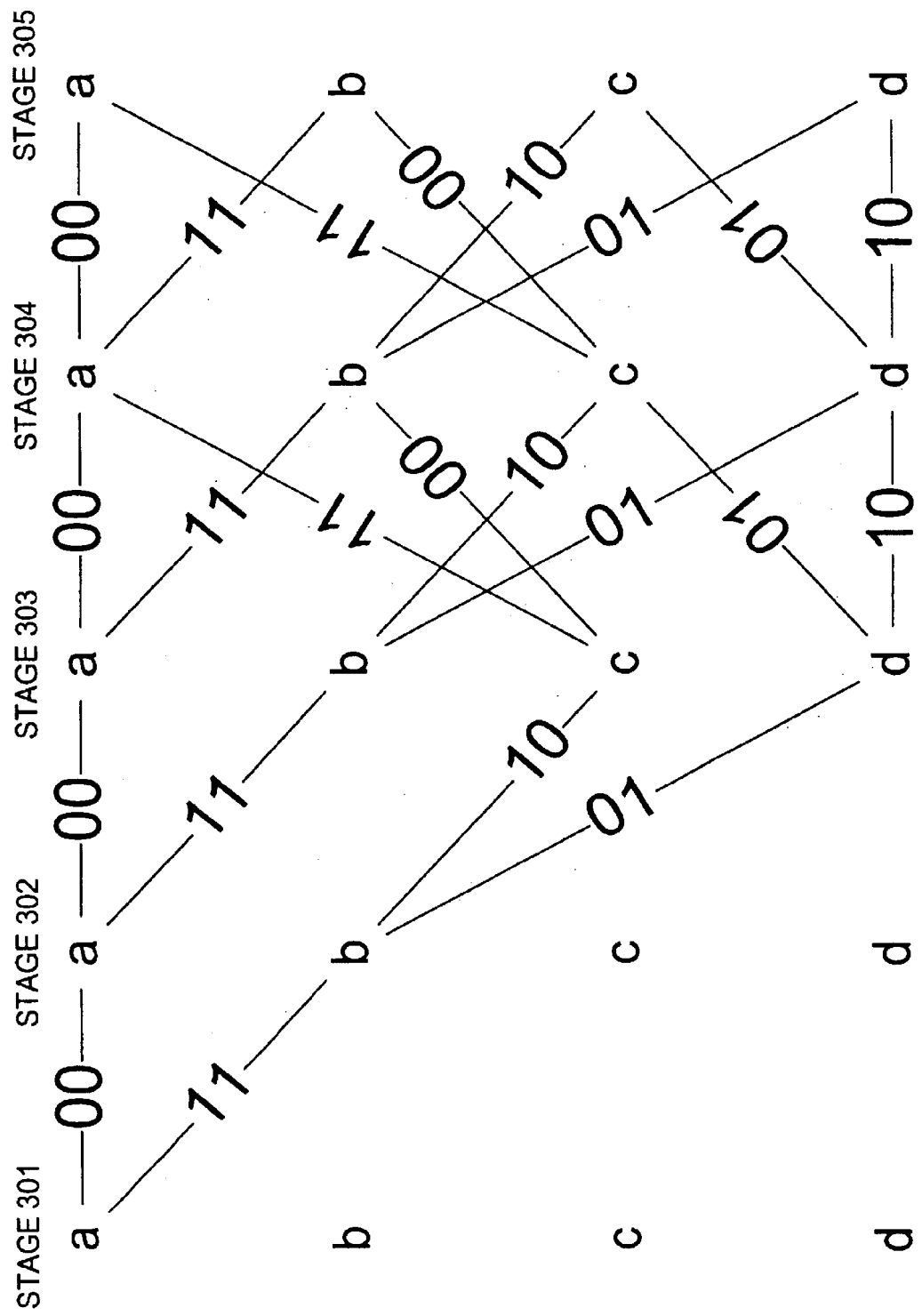
FIG. 3 illustrates a bit-wise trellis representation of a Viterbi decoder.

At the input of channel encoder 102 in FIG. 1 is a binary information sequence. Ideally, the same information sequence is present at the output of hard decision channel decoder 110. Toward that end, hard decision channel decoder 110 may use the Viterbi algorithm. FIG. 3 is a trellis representation of an example decoding scheme for use in conjunction with the Viterbi algorithm at a receiver when rate ½ convolutional encoding has been used at the transmitter. The trellis consists of stages (301, 302, 303, 304 and 305), states (a, b, c and d) and paths connecting states at adjacent stages. The trellis is created with the knowledge of the action of the encoder, as follows. Consider the states as representative of the state of a buffer in the encoder. The buffer could, for instance, store the two most recently received bits. In the trellis of FIG. 3, states a, b, c and d are representative of buffer states 00, 01, 10 and 11 respectively. The stages may be considered consecutive moments in time, where the transition from one stage to the next corresponds to a rate ½ encoder receiving one bit and generating two bits given the value of the one received bit and the two buffered bits. Each path, in the trellis of FIG. 3, is labelled with a binary path state which, in this case, is a series of two bits corresponding to the bits generated by the encoder in a response to a particular value of input bit. The binary path states in the trellis of FIG. 3 correspond to the encoding example given earlier in this document, namely $v_1 = u_t + u_{t-1} + u_{t-2}$ and $v_2 = u_t + u_{t-2}$, where $v_1 v_2$ is the path state (encoder output) resulting from an input bit of $u_t$ and a buffer state of $u_{t-2} u_{t-1}$. Note that there are two paths exiting each state as there are two possibilities for the input bit: 0 and 1. The path from state a of stage 301 to state a of stage 302 represents an input bit 0 in combination with the buffer state 00, while the path from state a of stage 301 to state b of stage 302 represents an input bit 1 in combination with the buffer state 00. The following table illustrates the action of an example encoder and the relationship to each path from one stage to another in the Viterbi trellis of FIG. 3.

| Initial Buffer State | Received Bit | Encoder Output (Binary Path State) | Final Buffer State | Path |
|---|---|---|---|---|
| a = 00 | 0 | 00 | a = 00 | aa |
| a = 00 | 1 | 11 | b = 01 | ab |
| b = 01 | 0 | 10 | c = 10 | bc |
| b = 01 | 1 | 01 | d = 11 | bd |
| c = 10 | 0 | 11 | a = 00 | ca |
| c = 10 | 1 | 00 | b = 01 | cb |
| d = 11 | 0 | 01 | c = 10 | dc |
| d = 11 | 1 | 10 | d = 11 | dd |

The Viterbi algorithm comprises computing a local metric, d, for each path and then selecting the one path, of many entering a state, with the smallest overall metric, D. The overall metric D is the sum of the local metric d for the path under consideration and the overall metric of the state at which the path under consideration originated. Where more than one path enters a state, the path resulting in the lesser overall metric is selected. The local metric for a particular path may be the Hamming distance between a sequence represented by the path and the received sequence. A survivor path, which may be associated with a particular state, is made up of selected paths through a trellis up to the particular state. At the end of a decoding procedure, the decoded bit sequence may be obtained by tracing back through the survivor path, since each path, between stages, in the survivor path corresponds to one bit of the original information sequence.

The Hamming distance between two sequences is the bit difference between the two sequences. Put another way, the Hamming distance may be found by performing an XOR operation on the two sequences and counting the 1 bits in the result.

A step of the Viterbi algorithm is performed as follows. Each state at stage j has an associated overall metric. For each state at stage j+1, an overall metric is determined for each incoming path. For each state, the algorithm compares the two paths entering the state. The path with the smallest overall metric is selected and the selected overall metric becomes the overall metric associated with the state at stage j+1. At the termination of the algorithm, the state at the final stage with the minimum overall metric is representative of the end of most likely encoded bit sequence. The encoded bit sequence may then be decoded to result in the original information sequence.

For example, consider a bit sequence 11 10 11 11 received by decoder 110 from a ½ rate convolutional encoder 102 which has encoded the bit sequence such that it may be decoded by the trellis of FIG. 3. An assumption is made that the buffer of encoder 102 was preloaded with 0s, as is known. Given that assumption, decoding can begin at state a. Referring to FIG. 3, and beginning at state a of stage 301, a local metric is computed for the first received pair (11) for each path leading from stage 301 to stage 302. The local metric $d_{aa}=2$ because the Hamming distance between the received pair (11) and the binary path state (00) of the path from state a of stage 301 to state a of stage 302 is 2. Since the algorithm begins at stage 301, the overall metric associated with stage 301 $D_{a301}$ is 0. Thus, the overall metric, $D_{a302}$, assigned to state a of stage 302 is $D_{a301}+d_{aa}=2$. Similarly, since the local metric $d_{ab}=0$, an overall metric $D_{b302}=0$ is assigned to state b of stage 302. Here, path aa is the survivor path for state a of stage 302 and path ab is the survivor path for state b of stage 302. The second received pair (10) is then used to compute local metrics for each path leading from stage 302 to stage 303. The overall metrics, which comprise the overall metric of the state at the origin of a particular path summed with the Hamming distance between the received pair and the binary path state of the path, are as follows, $D_{a303}=D_{a302}+d_{aa}=2+1=3$, $D_{b303}=D_{a302}+d_{ab}=2+1=3$, $D_{c303}=D_{b302}+d_{bc}=0+0=0$ and $D_{d303}=D_{b302}+d_{bd}=0+2=2$. The third received pair (11) is then used to compute local metrics for each path leading from stage 303 to stage 304. The overall metrics are as follows, $D_{a304}=\min[D_{a303}+d_{aa}, D_{c303}+d_{ca}]=D_{c303}+d_{ca}=0+0=0$, $D_{b304}=\min[D_{a303}+d_{ab}, D_{c303}+d_{cb}]=D_{c303}+d_{cb}=0+2=2$, $D_{c304}=\min[D_{b303}+d_{bc}, D_{d303}+d_{dc}]=D_{d303}+d_{dc}=2+1=3$ and $D_{d304}=\min[D_{b303}+d_{bd}, D_{d303}+d_{dd}]=D_{d303}+d_{dd}=2+1=3$. The fourth received pair (11) is then used to compute local metrics for each path leading from stage 304 to stage 305. The overall metrics are as follows, $D_{a305}=\min[D_{a304}+d_{aa}, D_{c304}+d_{ca}]=D_{a304}+d_{aa}=0+2=2$, $D_{b305}=\min[D_{a304}+d_{ab}, D_{c304}+d_{cb}]=D_{a304}+d_{ab}=0+0=0$, $D_{c305}=\min[D_{b304}+d_{bc}, D_{d304}+d_{dc}]=D_{b304}+d_{bc}=2+1=3$ and $D_{d305}=\min[D_{b304}+d_{bd}, D_{d304}+d_{dd}]=D_{b302}+d_{bd}=2+1=3$. As stage 305 is the end of the trellis, the least overall metric may be identified and a survivor path traced back. In this example, the least overall metric is the metric associated with state b. The paths in the survivor path for this state are, tracing left to right, ab, bc, ca and ab. It is these transitions in the survivor path that indicate the decoded bits. In this example, ab, bc, ca and ab may be decoded as the information sequence 1001.

Hard Symbols with Encryption

With hard symbols (bits), generally, when encryption is performed after encoding at a transmitter, decryption must be performed before decoding at the receiver. If the encryption and decryption are performed in a bit-wise manner, as is known, by performing an XOR operation with an encoded bit stream and an encryption mask as operands, the input to the decryption unit must be hard bits. Thus the output of the decryption unit, and therefore input to the channel decoder, is hard bits.

Encryption is necessarily reversible. If encryption is performed using an XOR operation, the mask used for encryption is the same as the mask used for decryption. Commonly, the encryption mask changes with time and the encryption and decryption operations need to be synchronized.

With hard symbols, conventionally, an encryption mask is applied to a received bit sequence and the decrypted result is compared to binary path states for transitions from one state to another in a decoding trellis.

Figure 5B:
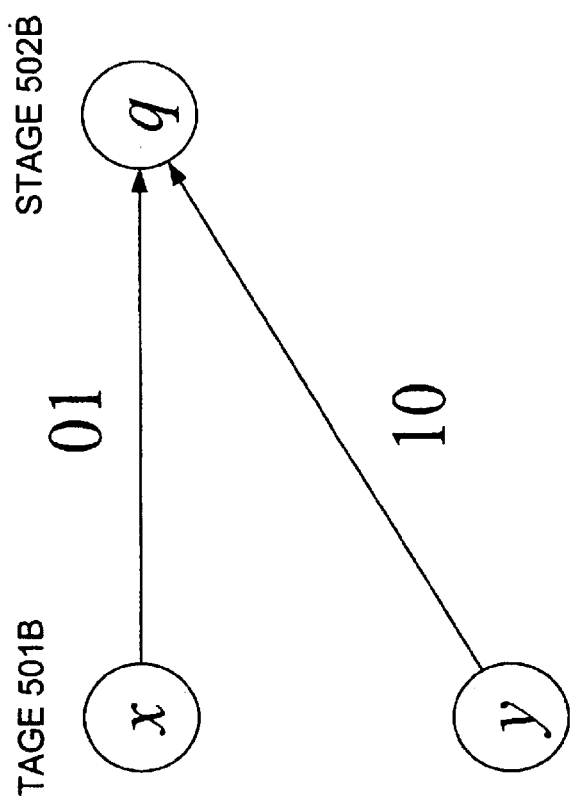
FIGS. 5A and 5B illustrate portions of a Viterbi decoding trellis with and without encryption of path states respectively.
Figure 5A:
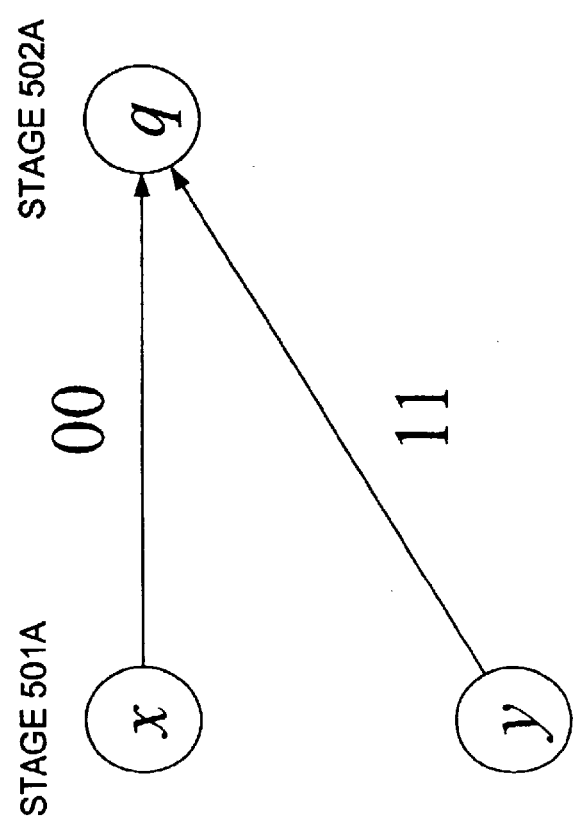

In an example case where an encryption mask is 01, a bit with a value 0 may be encoded as 00 and subsequently encrypted to yield 01. In the system of FIG. 1, the encrypted sequence is modulated, sent over the channel and demodulated after which the received sequence, 01, is input to decryption unit 116. The encryption mask is applied to the received sequence, yielding 00. In the transition from stage 501A to stage 502A of the trellis of FIG. 5A, the decrypted sequence is compared to the binary path states 00, for the xq path, and 11, for the yq path. As the local metric (Hamming distance=0) for the xq path is less than the local metric (Hamming distance=2) for the yq path, the received sequence may be decoded as being representative of a bit with a value 0.

We have discovered that if the encryption mask is instead applied to the various binary path states to which the received bit sequence is compared, then decoding and decrypting may occur simultaneously.

To combine the operations of decoding and decrypting, again, consider an encryption mask of 01 and a bit with a value 0 encoded as 00, subsequently encrypted to yield 01. In this case, the received sequence, 01, is input to a decoder with embedded decryption. To embed decryption in decoding, the path states of the decoding trellis are encrypted. As the encryption mask changes with time, encryption of path states is performed just before the comparison to the received sequence. Specific to the example under consideration, application of the encryption mask produces a path state of 01 for the xq path and a path state of 10 for the yq path. In the transition from stage 501B to stage 502B in the encrypted trellis of FIG. 5B, the received sequence, 01, is compared to encrypted path state 01, for the xq path, and 10, for the yq path. As the local metric (Hamming distance=0) for the xq path is less than the local metric (Hamming distance=2) for the yq path, the received sequence may be decoded as being representative of a bit with a value 0.

Soft Symbols without Encryption

Figure 6:
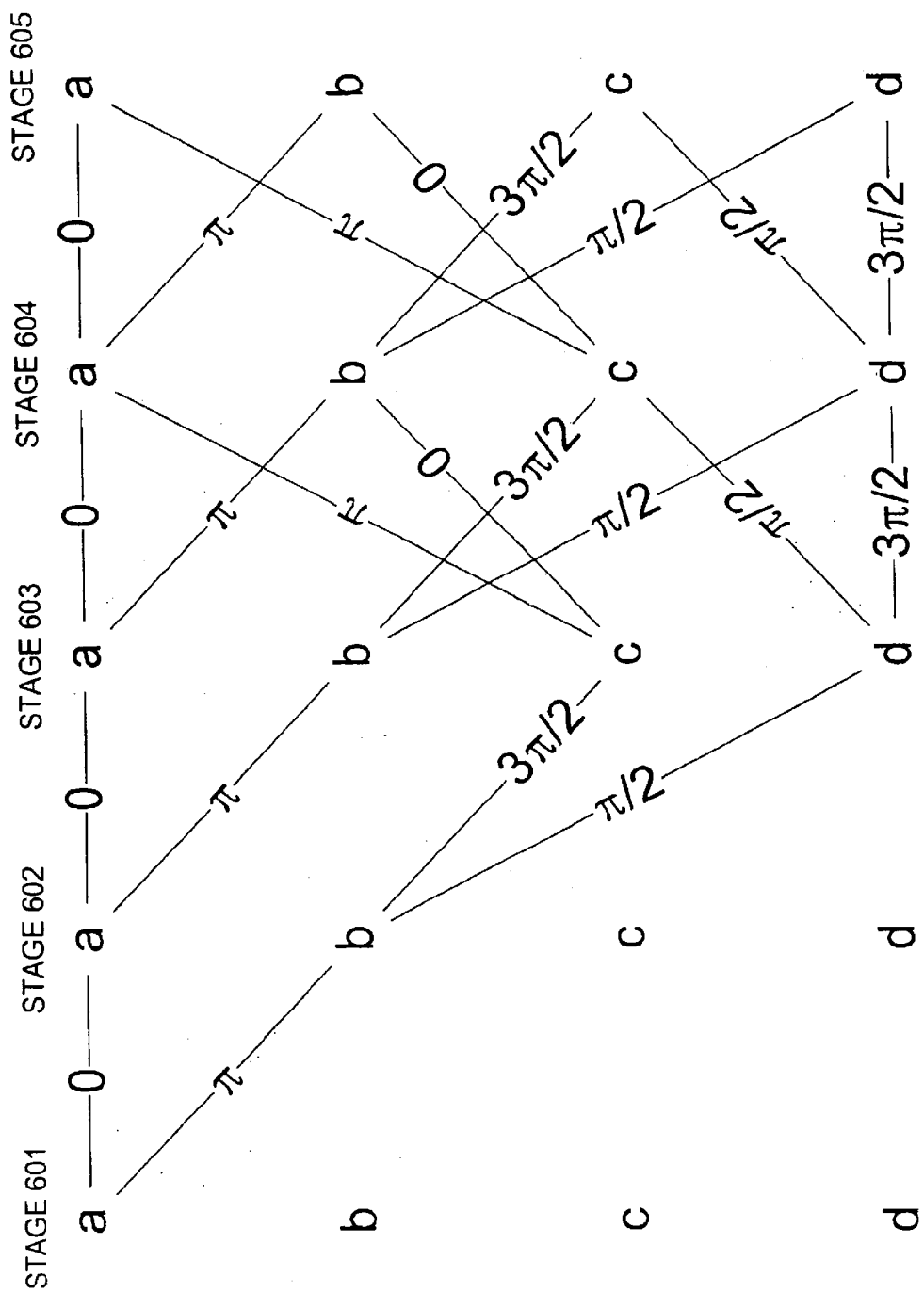
FIG. 6 illustrates a symbol domain trellis representation of a Viterbi decoder. In this figure, phase angle θ, representing $e^{j\theta}$, is used to label the path state.

In the absence of encryption, a trellis similar to the one illustrated in FIG. 3 may be used for Viterbi decoding when soft symbols are received from the demodulator instead of hard bits. If, for instance, a coherence Quadrature PSK scheme, such as illustrated in FIG. 4, is used for modulation, the sent soft symbols will have phases 0, $\pi/2$, $\pi$ and $3\pi/2$ corresponding to sent hard bits 00, 01, 11 and 10, respectively. If a demodulator in a receiver outputs received soft symbols corresponding to the above sent soft symbols, a suitable decoding trellis, such as the one illustrated in FIG. 6, is required for Viterbi decoding. In FIG. 6, soft path states have replaced the binary path states of FIG. 3. In a manner similar to the hard bit case, the soft path states represent the sent symbols. When Viterbi decoding is performed on received soft symbols, a different measure is necessary for computing local metrics. Rather than a Hamming distance between a received bit sequence and a binary path state of a particular path, the local metric for a path may be computed as the Euclidean distance between the received soft symbol and the soft path state of a particular path. When computed using Euclidean distance, the metric is likely to more accurately reflect the difference between received information and sent information. As an overall metric accumulates over a trellis, this increased accuracy better defines a maximum likelihood survivor path.

Consider an M-PSK symbol sequence, h, that represents the information sequence which has been convolutionally coded and mapped into one of M possible M-PSK symbols. The kth element of symbol sequence h is $h_k$ where $$h_k = e^{j2\pi \frac{(m-1)}{M}}, m \in [1, 2, \ldots, M].$$

On the receiver side, the received symbol sequence after demodulation can be represented as r. The kth element of the received symbol sequence r in an AWGN channel is $r_k$ where $$r_k = \sqrt{\varepsilon_s} \, e^{j2\pi \frac{(m-1)}{M}} + n(k),$$

$\varepsilon_s$ is symbol energy and n(k) represents channel noise.

The value of a local metric, d, for a maximum likelihood decoding algorithm may be p(r|h) or a related value such as log(p(r|h)). The expression p(r|h) represents the joint probability of $r_k$ conditioned on the transmitted sequence $h_k$, where $r_k$ and $h_k$ denote the kth elements of r and h respectively. A likelihood function is defined $$p(r|h) = \prod_{k=1}^{K} p(r_k | h_k).$$

Correspondingly, a log-likelihood function is $$\log[p(r|h)] = \sum_{k=1}^{K} \log[p(r_k | h_k)].$$

The log-likelihood function is preferred over the likelihood function for computing a local metric, d, because of reduced computational complexity of the addition operation of the former over the multiplication operation of the latter.

It can be shown that $\log[p(r|h)] = C \cdot \|r - h\|^2$ where C is a constant common for all paths and $\|\cdot\|$ is Euclidean distance. For two N-dimension vectors $x=(x_1, x_2, \ldots x_N)$ and $y=(y_1, y_2, \ldots y_N)$, Euclidean distance is defined as $$\|x - y\| = \sqrt{\sum_{i=1}^{N} (x_i - y_i)^2}.$$

Let an overall metric, $D_f$, be the sum of local metrics of each path along a survivor path terminating at state f. Let $s_i$ be soft path state for a path originating at generic state i. Where $r_j$ is a received soft decision input, the value of a local metric, d, for a maximum likelihood decoding algorithm may be determined from $\log|p(r_j|s_i) = C \cdot \|r_j - s_i\|^2$. For a path from a state x to a state q, a local metric $d_{xq}$ may be calculated using the received soft decision input $r_j$ and soft path state $s_x$. For each of the paths entering state q, an overall path metric, $D_{iq} = D_i + d_{iq}$, may be calculated. The path with the lesser overall path metric $D_{iq}$, that is, the local metric $d_{iq}$ plus an overall state metric $D_i$ associated with the originating state i, is chosen to be the survivor path and the local metric of the survivor path is accumulated into the overall state metric for state q, $D_q$. For example, where a transition from state x to state q is compared to a transition from state y to state q, $$D_q = \min[D_{xq}, D_{yq}].$$

In addition, the survivor path is stored for later traceback.

Soft Symbols with Encryption

A problem arises if encryption is to be employed with soft symbols as a soft symbol cannot be an operand for an XOR operation. With soft symbols, one way to perform decryption with an XOR operation would be to convert the soft symbols to hard bits. But if this is done, the increased accuracy attendant upon using soft symbols is lost. Using a separate decryption unit and decoder, then, precludes soft symbol decoding. We have demonstrated, though, that decryption may be embedded in a decoding process in the hard bit domain. It is proposed to embed decryption in decoding in the symbol domain. The result of this combination may be the soft-decision channel decoder with embedded decryption 710 of FIG. 7.

Figure 7:
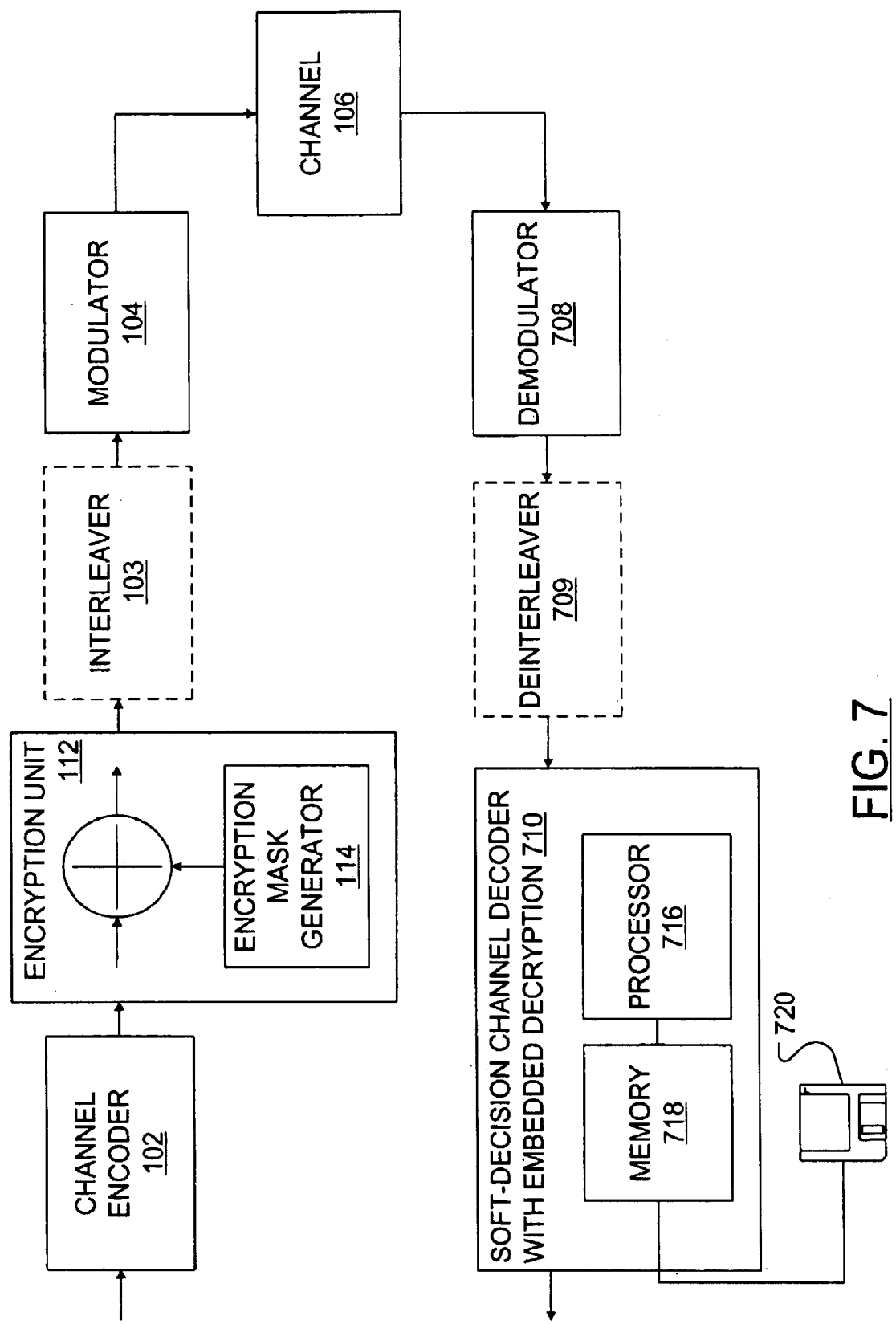
FIG. 7 illustrates, in a block diagram, a communication system in accordance with the present invention.

Turning to FIG. 7, wherein like parts to those of FIG. 1 have been given like reference numerals, note that the difference between the system of FIG. 1 and the system of FIG. 7 is only found on the receiver side of the channel. Information is encoded, encrypted, possibly interleaved and then modulated in the same manner in both systems. The differences start with demodulation. Where the output of demodulator 108 is hard decisions, or bits, the output of a demodulator 708 is soft decision symbols. These soft decision symbols may be received directly by a soft-decision channel decoder with embedded decryption 710 that replaces both decryption unit 116 and hard decision channel decoder 110 of FIG. 1. Soft-decision channel decoder with embedded decryption 710 comprises a processor 716 and a memory 718 loaded with software for executing the method of this invention from software medium 720 which could be a disk, a tape, a chip or a random access memory containing a file downloaded from a remote source. In another embodiment, output of demodulator 708 is first deinterleaved by deinterleaver 709 and then passed to soft-decision channel decoder with embedded decryption 710.

In operation, soft-decision channel decoder with embedded decryption 710 receives a soft decision input (symbol) from demodulator 708 and the processor 716, under control of software in memory 718, undertakes the method of this invention to select one path of many entering each state of the appropriate stage of a decoding trellis. Path selection is repeated for each received soft decision input. Once an end of the decoding trellis is reached, a decoded and decrypted bit sequence is obtained in a conventional manner.

Consider a first embodiment (without interleaving) of the system of FIG. 7 comprising a transmitter with output from encryption mask generator 114 being applied to obtain an encrypted and encoded information sequence after convolutional encoding and before modulation.

If encryption is applied, the received soft decision input $r_j$ is in the encryption domain. Therefore, the pre-encrypted soft path state $s_i$ should not be used to compute local metric $d_{iq}$. Instead, a soft path state in the encryption domain, $\hat{s}_i$, should be used.

Encrypted soft path state $\hat{s}_i$ can be computed by first finding the binary path state $b_i$ corresponding to pre-encrypted soft path state $s_i$ (which, for example, for Quadrature PSK, is typically as shown in FIG. 4), then performing an XOR operation on $b_i$ using the proper encryption mask to obtain an encrypted binary path state $\hat{b}_i$, and finally finding the encrypted soft path state $\hat{s}_i$ corresponding to $\hat{b}_i$.

As the received soft decision input $r_j$ is being compared to the encrypted soft path state $\hat{s}_i$, local metric calculation becomes $\hat{d}_{iq}=C \cdot \|r_j - \hat{s}_i\|^2$ for a path from a generic state i to the state under consideration q. This equation for the local metric calculation used in path selection is repeated through the entire trellis during the decoding. At the end of the trellis, a decoded and decrypted bit sequence is obtained by tracing back as in standard Viterbi decoding.

To review, when performing soft decision Viterbi decoding, the soft path states of the decoding trellis must be converted to the bit domain, encrypted and returned to the symbol domain before the calculation of local metrics. It should be noted that given the changing nature of the encryption mask, a static soft decision decoding trellis without encryption, such as that illustrated in FIG. 6, is maintained by soft-decision channel decoder with embedded decryption 710 (To minimize processing, the static trellis is stored after conversion of the soft path states to binary path states). Encryption of the soft path states is accomplished in conjunction with the receipt of each soft decision input.

Figure 8:
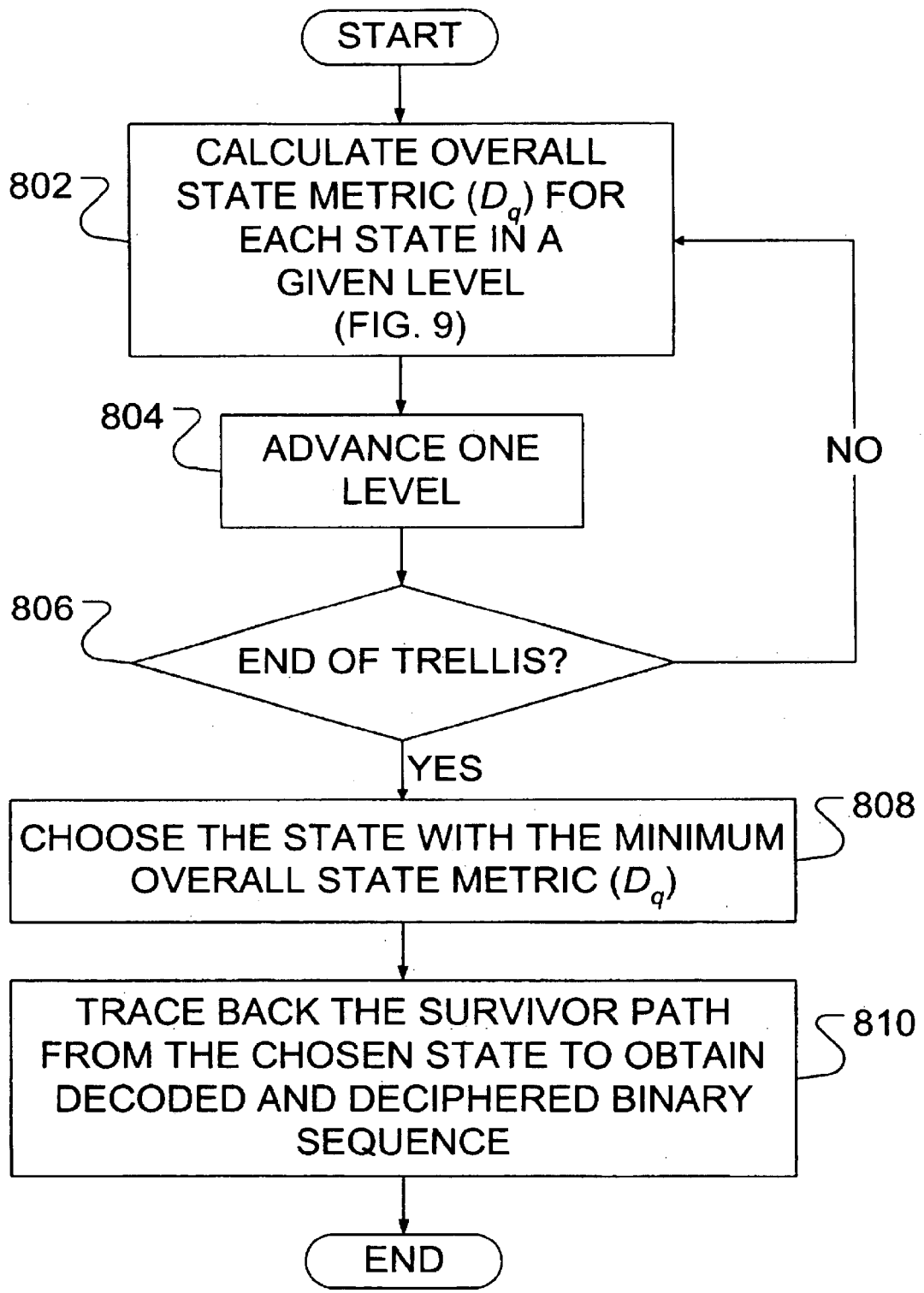
FIG. 8 illustrates a flow diagram for a known maximum likelihood decoding procedure.
Figure 9:
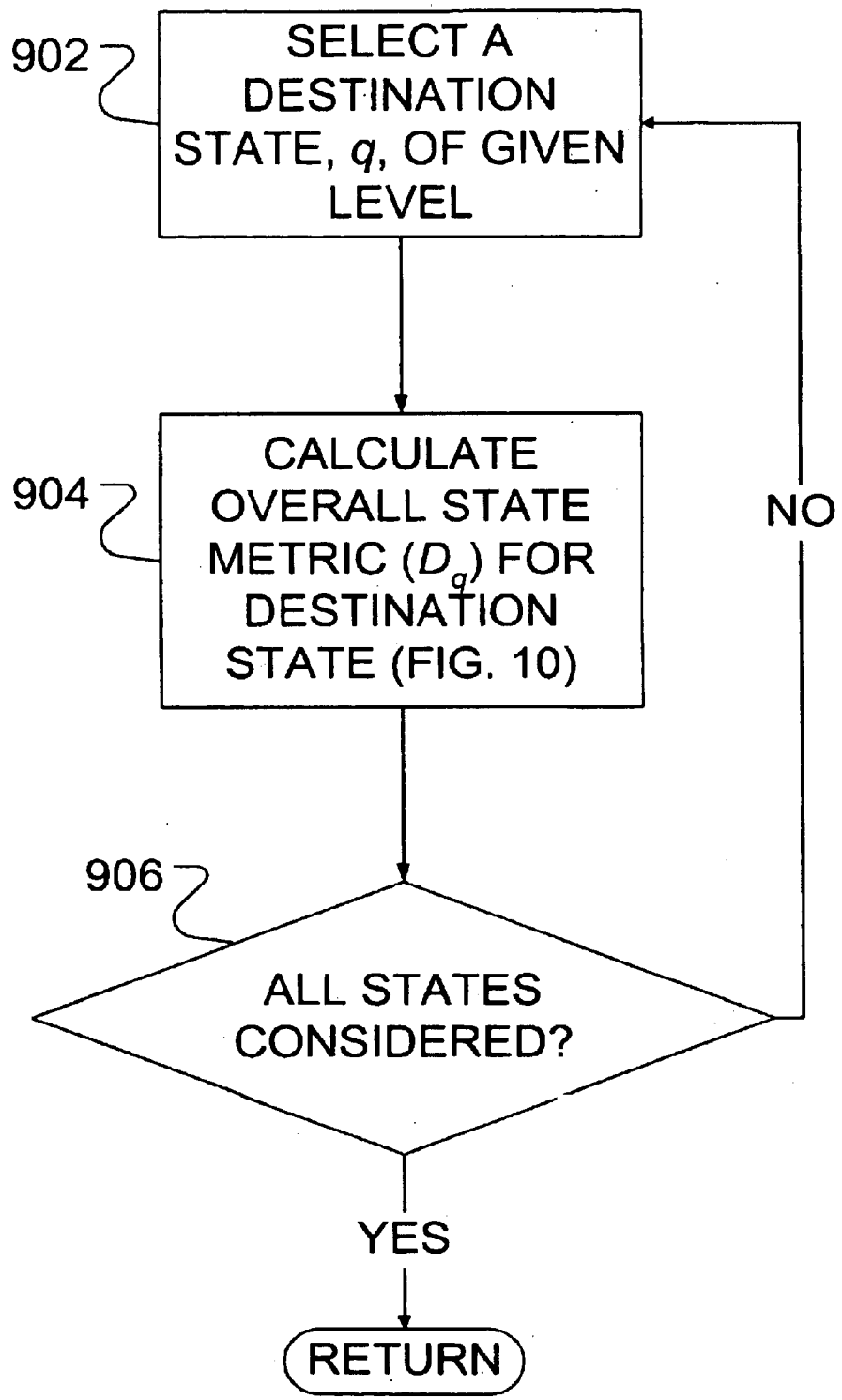
FIG. 9 illustrates a flow diagram for a known method of calculating an overall metric for each state in a stage.
Figure 10:
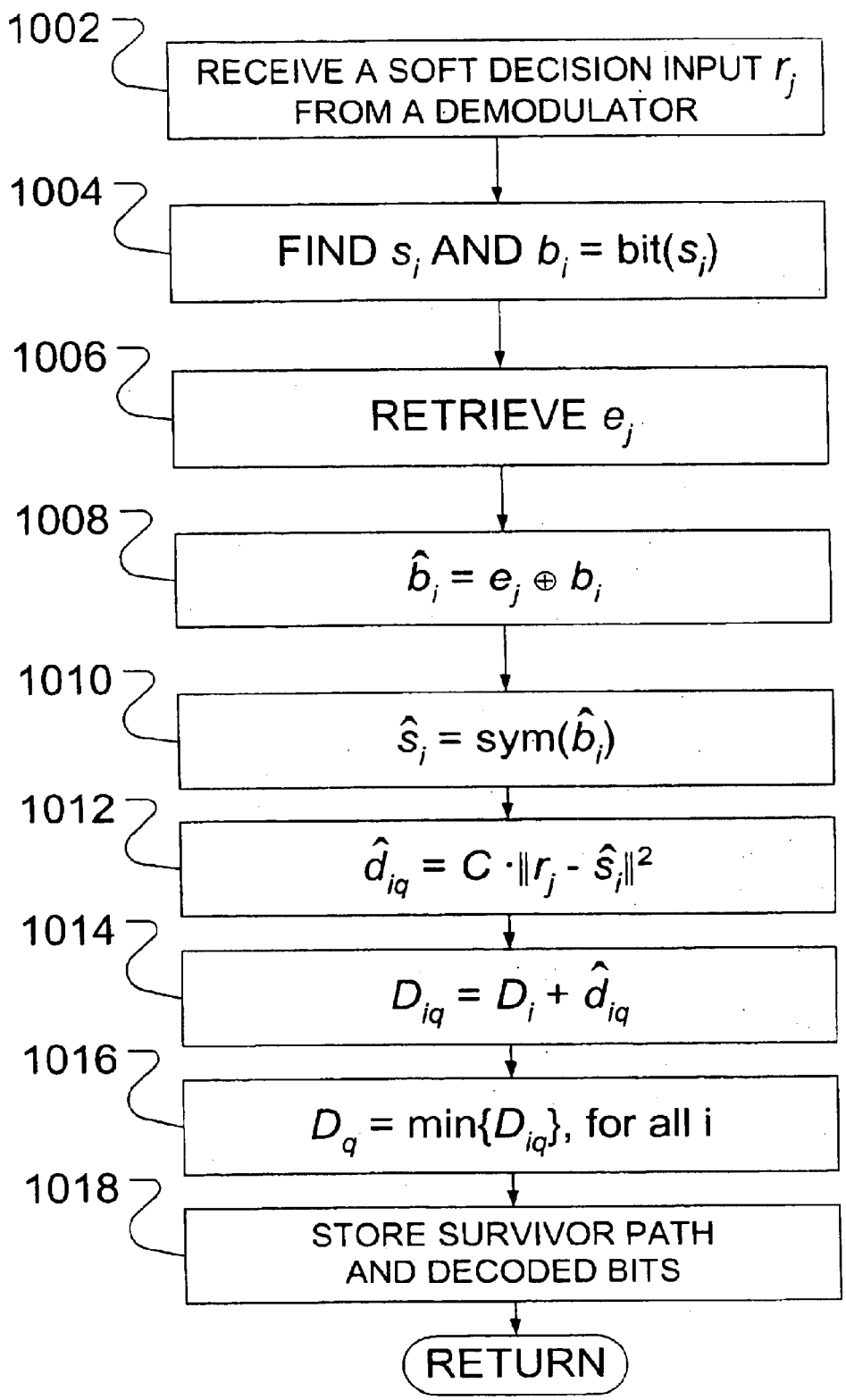
FIG. 10 illustrates a flow diagram for a method of metric calculation in accordance with an embodiment of the present invention.

The method of the present invention can be summarized in conjunction with FIGS. 8–10. With reference to FIG. 8, as a stream of symbols is received, calculation of the overall metrics of all states associated with a particular stage (step 802) is repeated through an entire trellis (step 804). At the end of the trellis (step 806), the state with the minimum overall metric is chosen (step 808) and a decoded and decrypted binary sequence is obtained by tracing back the survivor path which ends at the chosen state (step 810) as in standard Viterbi decoding.

FIG. 9 illustrates the sub-steps of step 802 involved in determining the value of the overall metric for each state in a particular stage. A destination state of the stage under consideration is selected (step 902) and the overall metric for the destination state is calculated (step 904). Lastly, a decision is made as to whether all states in the stage have been considered.

As illustrated in FIG. 10, the overall metric calculation step for a destination state q (step 904) has the following phases:

(A) At time j, receive a soft decision input $r_j$ from a demodulator (step 1002).

(B) From the static trellis maintained in the decoder, find the soft path states, $s_x$ and $s_y$, which lead to the destination state q and therefore find the binary path states, $b_x$ and $b_y$, corresponding to the soft path states (step 1004).

(C) Retrieve an encryption mask $e_j$; $e_j$ has the same number of bits as $b_x$ and $b_y$ and corresponds to the current time $t_j$ (step 1006).

(D) XOR $e_j$ with $b_x$ and $b_y$ to yield $\hat{b}_x$ and $\hat{b}_y$ (step 1008).

(E) Find the soft path state $\hat{s}_x$ and $\hat{s}_y$ corresponding to $\hat{b}_x$ and $\hat{b}_y$ (step 1010).

(F) Calculate local metrics $\hat{d}_{xq}$ and $\hat{d}_{yq}$, where $\hat{d}_{iq}=C \cdot \|r_j - \hat{s}_i\|^2$ (step 1012) and overall metrics $D_{xq}$ and $D_{yq}$, where $D_{iq}=D_i+\hat{d}_{iq}$ (step 1014) with i=x or i=y. Choose the path with the lesser overall path metric $D_{iq}$ (step 1016) to be the survivor path ($D_q=\min[D_{iq}]$). Note that the encrypted path state is only used to calculate the local metric.

(G) Store the survivor path and the decoded bit(s) associated with each path in the survivor path (step 1018) for traceback.

Note that decryption is embedded in phases (C) through (E). Phases (A), (B), (F) and (G) are the same as in the standard Viterbi algorithm. As well, note that, although in the above example only two paths enter each state, a decoding trellis may have a plurality of paths entering each state, dependent upon the encoding scheme.

By way of example, consider a system wherein a coherence Quadrature PSK scheme is used for modulation and the sequence at the output of encoder 102 at time $t_j$ is 01. Without encryption, 01 is mapped according to FIG. 4, to $$s_j = e^{j\frac{\pi}{2}}$$

which is transmitted. The fact that $s_j$ may be transmitted using I and Q symbols is not addressed here since it does not affect the method of the present invention, also, $\sqrt{\epsilon_s}$ is omitted without loss of generality. On the receiver side, the received symbol may be $$r_j = e^{j\frac{3\pi}{8}}$$

due to channel distortion. As illustrated in FIG. 11A, the two binary path states leading to destination state q are $b_x$=01

(from x) and $b_y$=10 (from y). The corresponding soft path states are then $$s_x = e^{j\frac{\pi}{2}} \text{ and } s_y = e^{j\frac{3\pi}{2}}.$$

According to the formula $d_{iq}=C\cdot\|r_j-s_i\|^2$, the resulting local metrics for the two paths in FIG. 11A are $d_{xq}$=0.1522 and $d_{yq}$=3.8478 (constant C is omitted here). Each local metric $d_{iq}$ is added to the appropriate overall metric $D_i$ of the previous time interval. The path (from x to q) that corresponds to the correct transmitted encoded bits is associated with the lesser of the two local metrics.

Now assume encryption is applied and the encryption mask $e_j$ corresponding to time $t_j$ is 11. After encryption, the sequence 01 (output by encoder 102) becomes 10 and is mapped to $$s_j = e^{j\frac{3\pi}{2}}.$$

If the same channel distortion occurs, the received symbol becomes $$r_j = e^{j\frac{11\pi}{8}}.$$

Using the method of the present invention, the encrypted binary path state is calculated for each path (step 1008, FIG. 10), giving $\hat{b}_x$=10 and $\hat{b}_y$=01, respectively. Then the corresponding encrypted soft path state is determined (step 1010, FIG. 10), giving $$\hat{s}_x = e^{j\frac{3\pi}{2}} \text{ and } \hat{s}_y = e^{j\frac{\pi}{2}}.$$

Now, the local metrics $\hat{d}_{xq}$ and $\hat{d}_{yq}$ can be calculated using $r_j$, $\hat{s}_x$ and $\hat{s}_y$. The result, as illustrated in FIG. 11B, is $\hat{d}_{xq}$=0.1522 and $\hat{d}_{yq}$=3.8478. Here, the path from x to q has the lesser local metric, which, correctly, is the same as the non-encryption case.

Now, consider a second embodiment of the system of FIG. 7 comprising a transmitter with encryption mask generator 114 being applied (XORed) to a bit sequence after convolutional encoding and before interleaving and subsequent modulation, similarly to the first embodiment. However, in the receiver, the soft-decision output of demodulator 708 is not soft symbols, as was the case in the first embodiment, but soft bits. Where a soft-decision in soft symbol format might be $$g_j = e^{j\frac{3\pi}{8}},$$

a soft-decision in soft bit format might be $g_j$=(0.38, 0.92). This soft-decision in soft bit format may then be processed by deinterleaver 709 resulting in soft-decision $r_j$ whose bit sequence is as it was at the output of encryption unit 112, i.e. before interleaving.

As in the first embodiment, soft-decision channel decoder with embedded decryption 710 receives soft decision input $r_j$ in the encryption domain. For each path, a soft path state $\hat{s}_i$ may be computed, as previously, by first finding the binary path state $b_i$ corresponding to pre-encrypted soft path state $s_i$, then performing XOR on $b_i$ using the encryption mask corresponding to this time to obtain an encrypted binary path state $\hat{b}_i$, and finally finding the encrypted soft path state $\hat{s}_i$ corresponding to $\hat{b}_i$.

In an alternative embodiment, the encryption mask does not change with time. In such a case, all path states of the Viterbi decoding trellis may be encrypted in advance, rather than upon the receipt of each decision.

As the method of the present invention may be used in decoding bit sequences encoded using general convolutional code, it may also be used in decoding bit sequences encoded using modified convolutional code such as those employing puncturing or tailbiting.

Other modifications will be apparent to those skilled in the art and, therefore, the invention is defined in the claims.

We claim:

1. A method to be employed during channel decoding, said method comprising:
    obtaining a channel decoding trellis having states, stages, and paths between states of adjacent stages, each of said paths having an associated path state;
    encrypting each said path state with an encryption mask to result in an encrypted path state.

2. In a channel decoding trellis comprising states and paths between said states, a method for selecting one path from a plurality of paths leading to a destination state comprising:
    for each path of said plurality of paths leading to said destination state,
        encrypting a path state, associated with said each path, with an encryption mask to result in an encrypted path state;
        determining a local metric from an input and said encrypted path state;
        associating said local metric with said each path;
        associating an overall path metric with said each path, where said overall pat metric is equivalent to a sum of said local metric associated with said each path and an overall state metric associated with a state at the origin of said path; and
    selecting one path of said plurality of paths leading to said destination state based, at least in part, on each said overall path metric associated with said each path.

3. The method of claim 2 wherein said input is in a symbol domain and said local metric determining further comprises mapping said encrypted path state to said symbol domain to result in a encrypted soft path state.

4. The method of claim 3 wherein said local metric determining comprises determining a Euclidean distance between said input and said encrypted soft path state and basing said local metric, at least in part, on said Euclidean distance.

5. The method of claim 4 wherein said local metric determining further comprises squaring said Euclidean distance between said input and said encrypted soft path state to obtain a square of said Euclidean distance and basing said local metric, at least in part, on said square of said Euclidean distance.

6. The method of claim 2 wherein said encryption mask corresponds to a current time.

7. The method of claim 2 wherein said path state consists of a bit sequence and said encryption mask is a bit sequence with the same number of bits as said path state.

8. The method of claim 7 wherein said encrypting comprises performing an exclusive or operation with said encryption mask and said path state as operands.

9. A decoder including a processor for selecting one path from a plurality of paths leading to a destination state, said plurality of paths in a channel decoding trellis comprising states and paths between said states, said processor comprising:

means for encrypting a path state, associated with said each path, with an encryption mask to result in an encrypted path state;

means for determining a local metric from an input and said encrypted path state;

means for associating said local metric with said each path; and means for associating an overall path metric with said each path, where said overall path metric is equivalent to a sum of said local metric and an overall state metric associated with a state at the origin of said path; and means for selecting one path of said plurality of paths leading to said destination state based at least in part on each said overall path metric.

10. A communication system comprising an encoder;

an encryption unit receiving input from said encoder;

a modulator receiving input from said encryption unit;

a channel receiving input from said modulator;

a demodulator receiving input from said channel;

a signal processor, receiving input from said demodulator, comprising:

means for encrypting a path state, associated with said each path, with an encryption mask to result in an encrypted path state;

means for determining a local metric from an input and said encrypted path state;

means for associating said local metric with said each path;

means for associating an overall path metric with said each path, where said overall path metric is equivalent to a sum of said local metric and an overall state metric associated with a state at the origin of said path; and means for selecting one path of said plurality of paths leading to said destination state based at least in part on each said overall path metric.

11. A communication system comprising an encoder;

an encryption unit receiving input from said encoder;

an interleaver receiving input from said encryption unit;

a modulator receiving input from said interleaver;

a channel receiving input from said modulator;

a demodulator receiving input from said channel;

a deinterleaver receiving input from said demodulator;

a signal processor, receiving soft decision input from said deinterleaver, comprising:

means for encrypting a path state, associated with said each path, with an encryption mask to result in an encrypted path state;

means for determining a local metric from an input and said encrypted path state;

means for associating said local metric with said each path;

means for associating an overall path metric with said each path, where said overall path metric is equivalent to a sum of said local metric and an overall state metric associated with a state at the origin of said path; and means for selecting one path of said plurality of paths leading to said destination state based at least in part on each said overall path metric.

12. A computer readable medium for providing program control for a processor in a communications system, said processor for selecting one path from a plurality of paths leading to a destination state, said plurality of paths in a channel decoding trellis comprising states and paths between said states, said processor operable to:

for each path of said plurality of paths leading to said destination state, encrypt a path state, associated with said each path, with an encryption mask to result in an encrypted path state;

determine a local metric from an input and said encrypted path state;

associate said local metric with said each path; and associate an overall path metric with said each path, where said overall path metric is equivalent to a sum of said local metric and an overall state metric associated with a state at the origin of said path; and select one path of said plurality of paths leading to said destination state based at least in part on each said overall path metric.

13. A method to be employed during decrypting and decoding encrypted coded soft symbols, said method comprising:

associating a given encrypted encoded soft symbol with at least one stage and state of a decoding trellis, each path of said decoding trellis having an associated soft symbol path state and an equivalent hard symbol path state;

obtaining an encryption mask for use in decrypting said given encrypted encoded soft symbol;

encrypting said equivalent bard symbol path state in said decoding trellis associated with each path leading to said at least one stage and state, utilising said encryption mask;

determining an encrypted soft symbol path state corresponding to each encrypted equivalent hard symbol path state; and determining metrics, each based on said given encrypted encoded soft symbol and one said encrypted soft symbol path state.

14. A decoder for use in decrypting and decoding encrypted coded soft symbols, comprising:

means for associating a given encrypted encoded soft symbol with at least one stage and state of a decoding trellis, each path of said decoding trellis having an associated soft symbol path state and an equivalent hard symbol path state;

means for obtaining an encryption mask for use in decrypting said given encrypted encoded soft symbol;

means for encrypting said equivalent hard symbol path state in said decoding trellis associated with each path leading to said at least one stage and state, utilising said encryption mask;

means for determining an encrypted soft symbol path state corresponding to each encrypted equivalent hard symbol path state; and means for determining metrics, each based on said given encrypted encoded soft symbol and one said encrypted soft symbol path state.

15. A method to be employed during decrypting and decoding encrypted coded symbols, said method comprising:

associating a given encrypted encoded symbol with at least one stage and state of a decoding trellis, each path of said decoding trellis having an associated symbol path state which, where said trellis is in a hard symbol domain, is a hard symbol path state and which, where said trellis is in a soft symbol domain, is a soft symbol path state with an equivalent hard symbol path state;

obtaining an encryption mask for use in decrypting said given encrypted encoded symbol;

encrypting said hard symbol path state in said decoding trellis associated with each path leading to said at least one stage and state, utilising said encryption mask; and determining metrics utilising said given encrypted encoded symbol and each said encrypted hard symbol path state.

16. A decoder for use in decrypting and decoding encrypted coded symbols, comprising:

means for associating a given encrypted encoded symbol with at least one stage and state of a decoding trellis, each path of said decoding trellis having an associated symbol path state which, where said trellis is in a hard symbol domain, is a hard symbol path state and which, where said trellis is in a soft symbol domain, is a soft symbol path state with an equivalent bard symbol path state;

means for obtaining an encryption mask for use in decrypting said given encrypted encoded symbol;

means for encrypting said hard symbol path state in said decoding trellis associated with each path leading to said at least one stage and state, utilising said encryption mask; and means for determining metrics utilising said given encrypted encoded symbol and each said encrypted hard symbol path state.

17. A method to be employed by a decoder, said method comprising:

obtaining an encryption mask;

in a decoding trellis having an associated soft symbol path state and an equivalent hard symbol path state,
determining a destination state corresponding with said encryption mask; and
encrypting said equivalent hard symbol path state associated with each path leading to said destination state utilising said encryption mask; and determining an encrypted soft symbol path state corresponding to each encrypted equivalent hard symbol path state.

18. A decoder comprising:

means for obtaining an encryption mask;

in a decoding trellis having an associated soft symbol path state and an equivalent hard symbol path state,
means for determining a destination state corresponding with said encryption mask and
means for encrypting said equivalent hard symbol path state associated with each path leading to said destination state utilising said encryption mask; and means for determining an encrypted soft symbol path state corresponding to each encrypted equivalent hard symbol path state.

19. A decoder including a processor for selecting one path from a plurality of paths leading to a destination state, said plurality of paths in a channel decoding trellis comprising states and paths between said states, said processor operable to:

encrypt a path state, associated with each path of said plurality of paths, with an encryption mask lo result in an encrypted path state;

determine a local metric from an input and said encrypted path state;

associate said local metric with said each path; and associate an overall path metric with said each path, where said overall path metric is equivalent to a sun of said local metric and an overall state metric associated with a state at the origin of said path; and select one path of said plurality of paths leading to said destination state based at least in part on each said overall path metric.

20. A communication system comprising an encoder;

an encryption unit receiving input from said encoder;

a modulator receiving input from said encryption unit;

a channel receiving input from said modulator;

a demodulator receiving input from said channel;

a signal processor, receiving input from said demodulator, operable to:

encrypt a path state, associated with each path of a plurality of paths in a channel decoding trellis leading to a destination state, with an encryption mask to result in an encrypted path state;

determine a local metric from an input and said encrypted path state;

associate said local metric with said each path;

associate an overall path metric with said each path, where said overall path metric is equivalent to a sum of said local metric and an overall state metric associated with a state at the origin of said path; and select one path of said plurality of paths leading to said destination state based at least in part on each said overall path metric.

21. A communication system comprising an encoder;

an encryption unit receiving input from said encoder;

an interleaver receiving input from said encryption unit;

a modulator receiving input from said interleaver;

a channel receiving input from said modulator;

a demodulator receiving input from said channel;

a deinterleaver receiving input from said demodulator;

a signal processor receiving soft decision input from said deinterleaver, operable to:

encrypt a path state, associated with each path of a plurality of paths in a channel decoding trellis leading to a destination state, with an encryption mask to result in an encrypted path state;

determine a local metric from an input and said encrypted path state;

associate said local metric with said each path;

associate an overall path metric with said each path, where said overall path metric is equivalent to a sum of said local metric and an overall state metric associated with a state at the origin of said path; and select one path of said plurality of paths leading to said destination state based at least in part on each said overall path metric.

22. A decoder for use in decrypting and decoding encrypted coded soft symbols, said decoder operable to:

associate a given encrypted encoded soft symbol with at least one stage and state of a decoding trellis, each path of said decoding trellis having an associated soft symbol path state and an equivalent hard symbol path state;

obtain an encryption mask for use in decrypting said given encrypted encoded soft symbol;

encrypt said equivalent hard symbol path state in said decoding trellis associated with each path leading to said at least one stage and state, utilising said encryption mask;

determine an encrypted soft symbol path state corresponding to each encrypted equivalent hard symbol path state; and determine metrics, each based on said given encrypted encoded soft symbol and one said encrypted soft symbol path state.

23. A decoder for use in decrypting and decoding encrypted coded symbols, said decoder operable to:

associate a given encrypted encoded symbol with at least one stage and state of a decoding trellis, each path of said decoding trellis having an associated symbol path state which, where said trellis is in a hard symbol domain, is a hard symbol path state and which, where said trellis is in a soft symbol domain, is a soft symbol path state with an equivalent hard symbol path state; obtain an encryption mask for use in decrypting said given encrypted encoded symbol;

encrypt said hard symbol path state in said decoding trellis associated with each path leading to said at least one stage and state, utilising said encryption mask; and determine metrics utilising said given encrypted encoded symbol and each said encrypted hard symbol path state.

24. A decoder operable to:

obtain an encryption mask;

in a decoding trellis having an associated soft symbol path state and an equivalent hard symbol path state,
determine a destination state corresponding with said encryption mask and
encrypt said equivalent hard symbol path state associated with each path leading to said destination state utilising said encryption mask; and
determine an encrypted soft symbol path state corresponding to each encrypted equivalent hard symbol path state.

25. A computer readable medium containing computer-executable instructions that, when performed by a processor in a communications system, said processor for selecting one path from a plurality of paths leading to a destination state, said plurality of paths in a channel decoding trellis comprising states and paths between said states, cause said processor:

for each path of said plurality of paths leading to said destination state,
encrypt a path state, associated with said each path, with an encryption mask to result in an encrypted path state;
determine a local metric from an input and said encrypted path state;
associate said local metric with said each path; and
associate an overall path metric with said each path, where said overall path metric is equivalent to a sun of said local metric and an overall state metric associated with a state at the origin of said path; and select one path of said plurality of paths leading to said destination state based at least in part on each said overall path metric.

* * * * *

UNITED STATES PATENT AND TRADEMARK OFFICE
CERTIFICATE OF CORRECTION

PATENT NO. : 6,760,438 B1
DATED : July 6, 2004
INVENTOR(S) : Hui et al.

It is certified that error appears in the above-identified patent and that said Letters Patent is hereby corrected as shown below:

Column 14,
Line 33, "overall pat metric" should be -- overall path metric --
Line 62, "exclusive or operation" should be -- exclusive-or operation --

Column 16,
Line 30, "equivalent bard symbol" should be -- equivalent hard symbol --

Column 17,
Line 20, "equivalent bard symbol" should be -- equivalent hard symbol --

Column 18,
Line 40, "signal processor receiving" should read -- signal processor, receiving --

Signed and Sealed this

Sixteenth Day of November, 2004

JON W. DUDAS
*Director of the United States Patent and Trademark Office*